(12) United States Patent
Wang et al.

(10) Patent No.: US 11,688,291 B2
(45) Date of Patent: Jun. 27, 2023

(54) COCKPIT DISPLAY SYSTEMS AND METHODS FOR DISPLAYING TAXIING ROUTE ON AIRPORT MOVING MAP

(71) Applicant: HONEYWELL INTERNATIONAL INC., Morris Plains, NJ (US)

(72) Inventors: Rui Wang, Phoenix, AZ (US); Gang He, Morristown, NJ (US); Zuowei He, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 193 days.

(21) Appl. No.: 16/920,114

(22) Filed: Jul. 2, 2020

(65) Prior Publication Data
US 2022/0005364 A1 Jan. 6, 2022

(51) Int. Cl.
G08G 5/06 (2006.01)
G01C 21/36 (2006.01)
G08G 5/00 (2006.01)

(52) U.S. Cl.
CPC ......... G08G 5/065 (2013.01); G01C 21/3676 (2013.01); G08G 5/0021 (2013.01); G08G 5/0078 (2013.01)

(58) Field of Classification Search
CPC .... G08G 5/065; G08G 5/0021; G08G 5/0078; G01C 21/3676
See application file for complete search history.

(56) References Cited

U.S. PATENT DOCUMENTS

| 8,024,078 B2 * | 9/2011 | Coulmeau ............ G08G 5/0021 701/16 |
| 8,280,618 B2 | 10/2012 | Feyereisen et al. |
| 8,386,167 B2 | 2/2013 | Clark et al. |
| 8,396,616 B1 | 3/2013 | Barber et al. |

(Continued)

FOREIGN PATENT DOCUMENTS

| EP | 2584550 A2 | 4/2013 |
| EP | 3200171 A1 | 8/2017 |
| WO | 2014115139 A1 | 7/2014 |

OTHER PUBLICATIONS

McCann, Robert, et al., "Advanced Navigation Aids in the Flight Deck: Effects on Ground Taxi Performance Under Low Visibility Conditions," SAE Transactions: Journal of Aerospace, 105, (1996), 1419-1430.

*Primary Examiner* — Frederick M Brushaber
*Assistant Examiner* — Elizabeth Yang
(74) *Attorney, Agent, or Firm* — Lorenz & Kopf LLP

(57) ABSTRACT

Methods and systems of determining and displaying a taxiing route on an airport moving map. The methods and systems include computer implemented steps of: deriving a location of the ground traffic with respect to taxiways or runways at an airport and a direction of travel of the ground traffic, executing a route planning algorithm for determining a route including one or more taxiways and runways from an aircraft location to the taxi destination using, as inputs, airport data from an airport mapping database, the location of the ground traffic, the direction of travel of the ground traffic, and a taxi destination, and generating a display for the display device including an airport moving map based on airport data from the airport mapping database and including a graphical depiction of the route on the airport moving map.

18 Claims, 5 Drawing Sheets

(56) References Cited

U.S. PATENT DOCUMENTS

| | | |
|---|---|---|
| 8,788,187 B2 | 7/2014 | Doose et al. |
| 9,786,186 B2 | 10/2017 | Ball et al. |
| 10,234,303 B1 | 3/2019 | Chandrashekarappa et al. |
| 2010/0198489 A1* | 8/2010 | Rozovski ............... G08G 5/065 701/120 |
| 2010/0324807 A1* | 12/2010 | Doose .................... G01C 23/00 701/120 |
| 2017/0004715 A1* | 1/2017 | Depape .............. G01C 21/3626 |
| 2017/0083206 A1 | 3/2017 | He et al. |
| 2018/0061243 A1* | 3/2018 | Shloosh ............... G08G 5/0043 |
| 2018/0374370 A1 | 12/2018 | Hvezda et al. |
| 2019/0080622 A1* | 3/2019 | Gros ...................... G08G 5/065 |
| 2019/0114933 A1 | 4/2019 | Veronesi et al. |
| 2019/0189018 A1 | 6/2019 | Marik et al. |
| 2021/0134167 A1* | 5/2021 | Erignac ................ G08G 5/0086 |

\* cited by examiner

COCKPIT DISPLAY SYSTEMS AND METHODS FOR DISPLAYING TAXIING ROUTE ON AIRPORT MOVING MAP

TECHNICAL FIELD

The present disclosure generally relates to methods and systems for determining and displaying taxiing routes at an airport.

BACKGROUND

During taxi operations, the workload of pilots is, in general, the highest in comparison to any other phase of flight. Complexity for a pilot is further amplified at complicated and unfamiliar airports, and during night and reduced visibility conditions. Cockpit displays with airport moving map and a graphic depicting taxi clearance and path information are highly useful for reducing the workload.

Since the taxi operation rules may change dynamically, the direction of a taxiway, and other conditions relevant to taxiing, may change multiple times during a day. As such, a rule-based path determination algorithm that takes into account a static airport database and ownship position information as inputs may not provide an optimal path based on current airport conditions.

Hence, it is desirable to provide systems and methods for determining and displaying a taxiing route that takes into account dynamic airport conditions. Further, an optimal taxiing route should be determined with minimal input from the crew of the aircraft so as to reduce the pilot workload during taxiing operations. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Methods and systems are disclosed herein of determining and displaying a taxiing route on an airport moving map. The methods and systems include computer implemented steps of: deriving a location of the ground traffic with respect to taxiways or runways at an airport and a direction of travel of the ground traffic, executing a route planning algorithm for determining a route including one or more taxiways and runways from an aircraft location to the taxi destination using, as inputs, airport data from an airport mapping database, the location of the ground traffic, the direction of travel of the ground traffic, and a taxi destination, and generating a display for the display device including an airport moving map based on airport data from the airport mapping database and including a graphical depiction of the route on the airport moving map.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
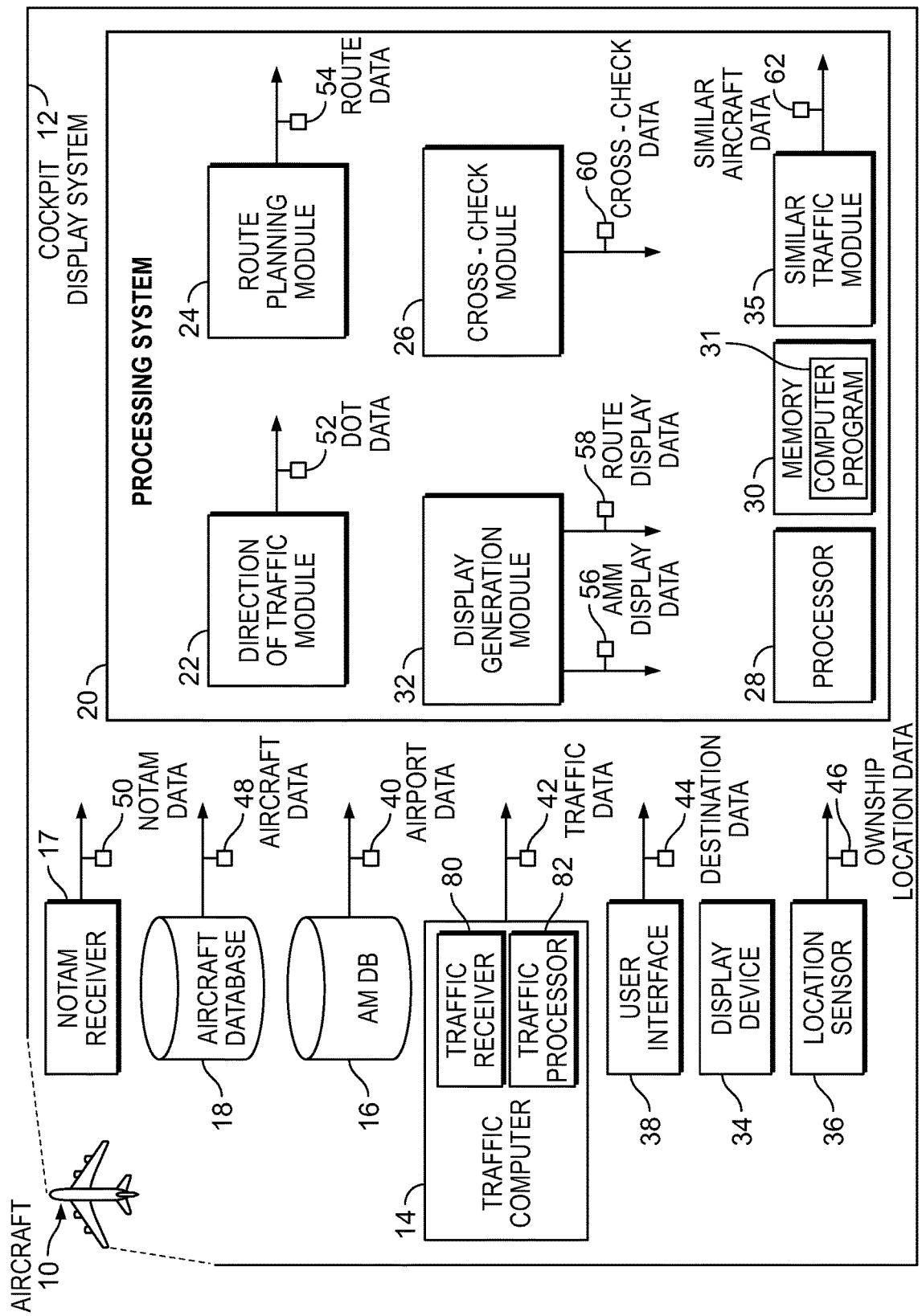
FIG. 1 is a block diagram depicting a cockpit display system, in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein determine a taxiing path and graphically depict the determined path. The path is determined with minimum input from a pilot. The pilot may be required to just input a taxi destination. In one embodiment, a pilot enters a taxi destination and the system determines a route for the pilot to graphically verify and confirm with air traffic control (ATC), and to accept the route, with little or no additional input. The route planning algorithm disclosed herein takes into account ground traffic data as one input to determine the route to the entered destination. Additional inputs for the route planning algorithm can include NOtice To AirMen (NOTAM) communications for taxiway information (such as taxiway closing), weight restrictions for operating taxiways, and historic taxiway or preferred taxiway path data.

The route planning algorithm disclosed herein factors in dynamic exogenous parameters including surrounding traffic. Traffic data concerning ground traffic is received from various sources, particularly Automatic Dependent Surveillance-Broadcast. The traffic data includes a time stamp and geographical location information for traffic. In conjunction with geographical and identification information of all taxiways from an airport database, the traffic data allows the following information to be determined: 1) which taxiway or runway the traffic is currently on; and 2) in which direction the traffic is moving. With such derived information from the traffic data and the airport database, the system could further understand if a given taxiway is a one-way or bi-directional taxiway and use this information when determining the taxiing route. By monitoring and taking into account direction of travel of traffic, the route planning algorithm is more likely to find the right path with only the destination input. That is, route options that travel along taxiways that have contraflow ground traffic are excluded even if these route options represent the shortest path. In another example of the use of traffic data, the route planning algorithm will favor a route taken by another aircraft recently over a route that encounters high traffic density.

The traffic data may contain a flight identifier of each aircraft. The flight identifier can be mapped to an aircraft model. The route planning algorithm can estimate an exit taxiway for landing based on monitoring similar sized aircraft models. By monitoring any aircraft that have a similar landing performance as the ownship and their deceleration and exit taxiway, the route planning algorithm can determine a most probable exit taxiway for the ownship and automatically present the route after touch down and when speed is lower than a configurable speed, thereby further helping pilots to manage the aircraft energy.

In embodiments described herein, NOTAM information provides information on closed runway/taxiway, wingspan limitations, obstacles etc. By taking such information into account, the route planning algorithm makes sure not to generate a path through the closed runway or taxiway and not to use a runway or taxiway having a wingspan limitation that is too narrow for the ownship aircraft. Further, the traffic data can be used to cross check the closure of runways and taxiways.

Accordingly, systems and methods described herein provide a route planner that is able to generate and depict a taxiing route to a destination that takes into account dynamically variable parameters relevant to which taxiways or runways can or should be used. Such parameters include traffic data and NOTAM notices. The route can be generated at an early stage in the taxiing process, which can then later be accepted when ATC clearance for the taxiing route is obtained. Since dynamic parameters are considered, the generated route is more likely to be in alignment with the ATC cleared route. In many cases, no further modifications to the route are required and the route can simply be accepted by the pilot. The pilot is thus provided with early notice of a route that is likely in line with an ATC cleared route and the pilot's workload during taxiing is significantly reduced.

FIG. 1 is a schematic diagram of a cockpit display system 12 of an aircraft 10. The cockpit display system 12 includes a NOTAM receiver 17, an aircraft database 18, an airport mapping database (AMDB) 16, a traffic computer 14, a user interface 38, a display device 34, a location sensor 36 and a processing system 20. It should be understood that FIG. 1 is a simplified representation of the cockpit display system 12, and FIG. 1 is not intended to limit the application or scope of the subject matter in any way. In practice, the cockpit display system 12 will include numerous other devices and components for providing additional functions and features, as will be appreciated in the art.

In embodiments, the aircraft 10 includes a cockpit, one or more engines, and a fuselage. The aircraft 10 can be a multicopter (or rotary-wing), fixed-wing or a tilt-wing aircraft. The aircraft 10 can be an airplane or a helicopter or other aircraft with powered rotors, such as cyclogyros/cyclocopters and tiltrotors.

In embodiments, the cockpit display system 12 includes the traffic computer 14, which includes, inter alia, a traffic receiver 80 and a traffic processor 82. The traffic processor 82 is configured to execute computer programming instructions stored on memory (not shown) to provide the various functions of the traffic computer 14 described herein. In embodiments, the traffic computer 14 receives, via the traffic receiver 80, and processes information from one or more sources of traffic information in order to generate traffic data 42. Traffic information may be obtained from broadcast mechanisms, such as, traffic information service-broadcast (TIS-B), one or more ADS-B sources, and Automatic Dependent Surveillance-Rebroadcast (ADS-R), or via Traffic Alert and Collision Avoidance System (TCAS) or any combination thereof. Information may be broadcast from ATC or other ground station broadcasts, other aircraft and other ground vehicles. In embodiments, the traffic computer 14 is configured to process ADS-B data (among other data inputs) received by an ADS-B receiver (shown as the traffic receiver 80) and to output the traffic data 42 via one or more communication buses. In embodiments, the traffic computer 14 receives information regarding traffic from other aircraft, ground vehicles, and ground systems to compute traffic states that may include position, velocity, acceleration, time, altitude, heading, aircraft/vehicle size, systems status, phase of operation, vehicle identifier (e.g. tail number), etc. Thus, the traffic computer 14 receives, via the traffic receiver 14, wireless signals comprising traffic information. Of particular relevance for the cockpit display system 12 described herein is that of timestamped location and optionally speed and vehicle identifier being included in the traffic data 42. This will allow the processing system 20 to track direction of travel of ground traffic and also to identify similar aircraft, as will be described further herein.

In embodiments, the AMDB 16 is a geographic information system (GIS) database of airports around the world. The AMDB 16 describes the spatial layout of each airport, the geometry of features including runways, taxiways and buildings. The AMDB 16 includes further information characterizing the features as attributes including surface type, identifier and runway slope. The Airport Mapping Database 16 drives onboard Synthetic View cockpit displays systems including Airport Moving Maps (AMM) and also D-Taxi applications. The AMDB 16 provides airport data 40 including features geospatially defining at least runways, taxiways, parking positions and gates and including identifiers for each feature as attributes. The AMDB 16 can include a route planning graph of edges and nodes in the airport data 40, which represents the geospatial airport features. Alternatively, such a graph can be constructed by the processing system 20 based on airport data 40. The airport data 40 allows the processing system 20 to perform route planning including identifying location and direction of travel of traffic on runways and taxiways based on the traffic data 42.

In embodiments, the user interface 38 is located in the cockpit and provides input to one or more system(s) of the aircraft 10. The user interface 38 includes any device suitable to accept input from a user for interaction with the systems of the aircraft 10. For example, the user interface 38 includes one or more of a keyboard, joystick, multi-way rocker switches, mouse, trackball, touch screen, touch pad, data entry keys, a microphone suitable for voice recognition, and/or any other suitable device. The user interface 38 allows a user to enter a taxi destination such as a particular runway during takeoff operations and a particular gate or parking stand when taxiing after landing. The user interface 38 thus outputs destination data 44 defining the taxi destination. In alternative embodiments, the destination is received from other aircraft systems. For example, the destination could be automatically linked from an ATC communications interface (not shown) or from a flight management system (FMS) based on a defined flight plan. The destination data 44, whether obtained from the user interface 38 or not, identifies a location (e.g. a runway or gate) in coordinates or in terms of an identifier for the airport feature. The identifier for the airport feature can be converted to coordinates by interrogating the AMDB 16. The destination data 44 provides a target for the route planning algorithm executed by the processing system 20.

In embodiments, the cockpit display system 12 includes a location sensor 36. In one embodiment, the location sensor 36 includes a Global Positioning System (GPS) or global navigation satellite system (GNSS) receiver and determines location of the ownship aircraft 10 based on global position data obtained from satellites, e.g. by trilateration with three or more satellites. In some embodiments, the location sensor 36 determines ownship aircraft location based on Wide Area Augmentation System (WAAS) or other augmented satellite-based global position data. A network of ground-based reference stations provides measurements of small variations in the GPS satellites' signals so that onboard GPS or GNSS receivers use the corrections while computing their positions to improve accuracy of location data. In this way, the location sensor 36 outputs ownship location data 46 specifying a geographic location of the aircraft 10. This ownship location data 46 can be used by the processing system 12 as a starting location for route planning. In other embodiments, the starting location is obtained from the flight plan or from a pilot defined location within the airport environment. For example, a nominal touchdown point on a target runway included in the flight plan could be used or a starting location (e.g. a gate) defined in the flight plan could be used. In other instances, pilot can choose a taxi way exit location as a starting point when planning for landings.

Figure 2:
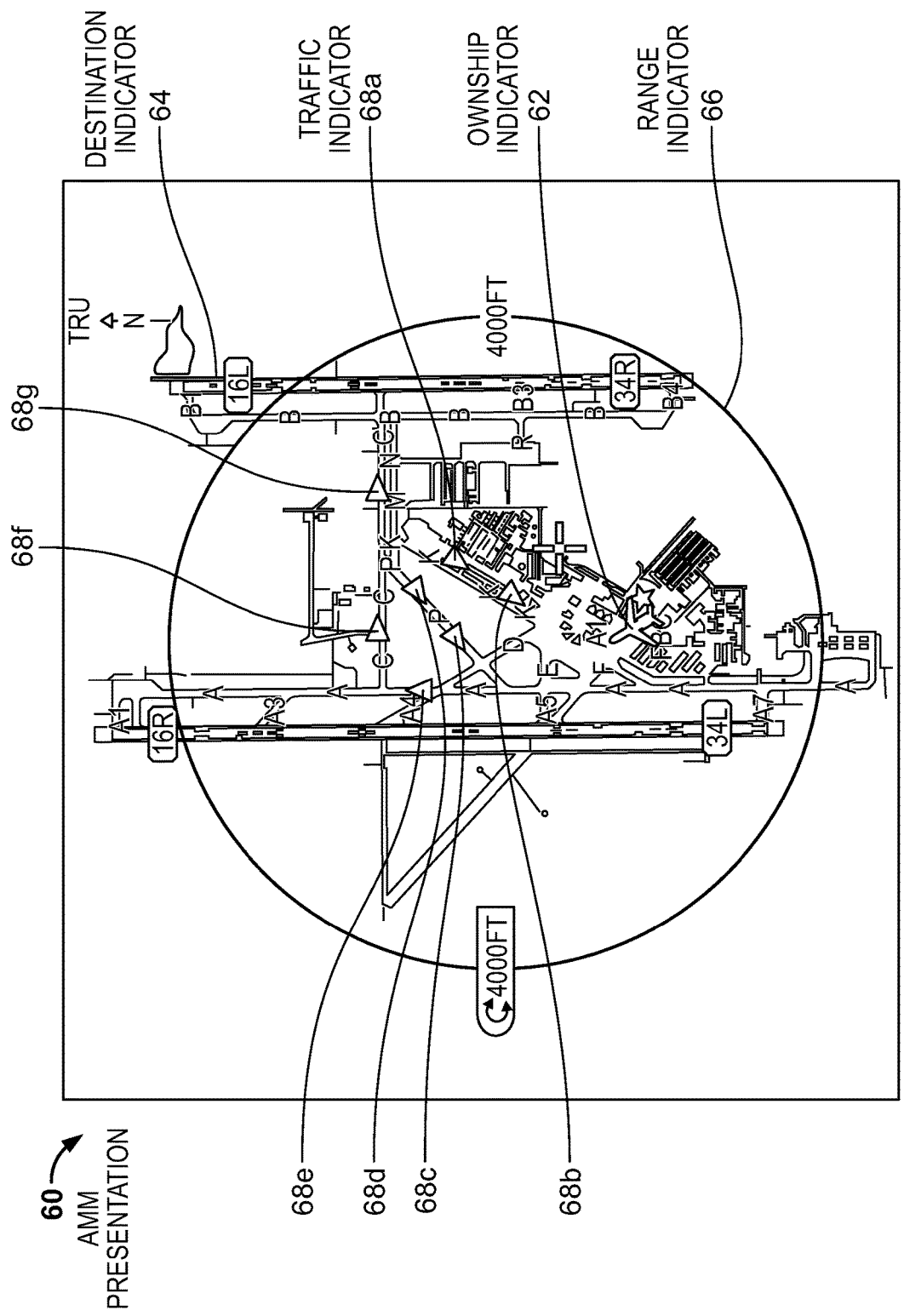
FIG. 2 is an airport moving map presentation generated by the cockpit display system, in accordance with an exemplary embodiment.
Figure 3:
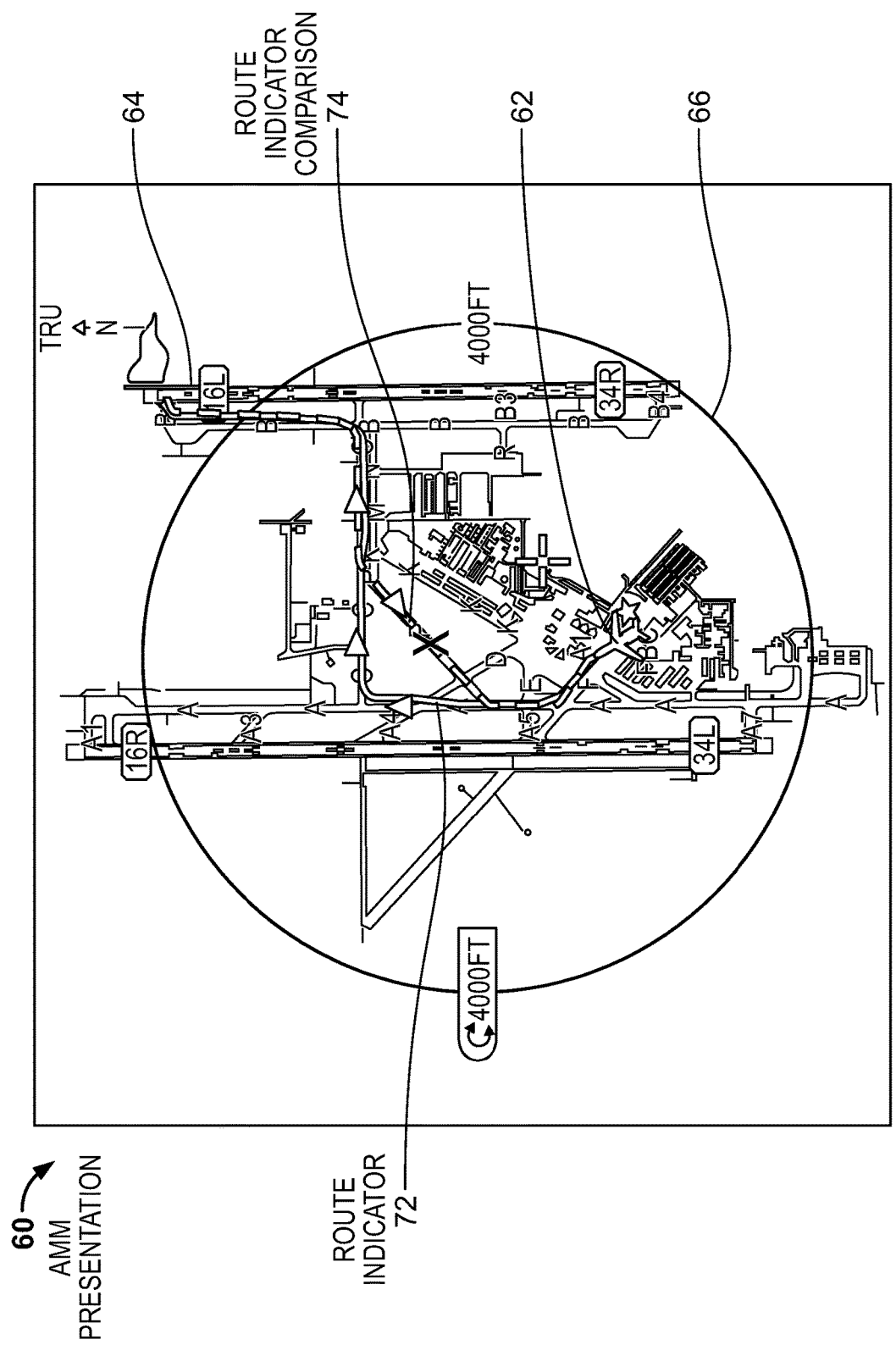
FIG. 3 is an airport moving map presentation generated by the cockpit display system, in accordance with an exemplary embodiment.
Figure 4:
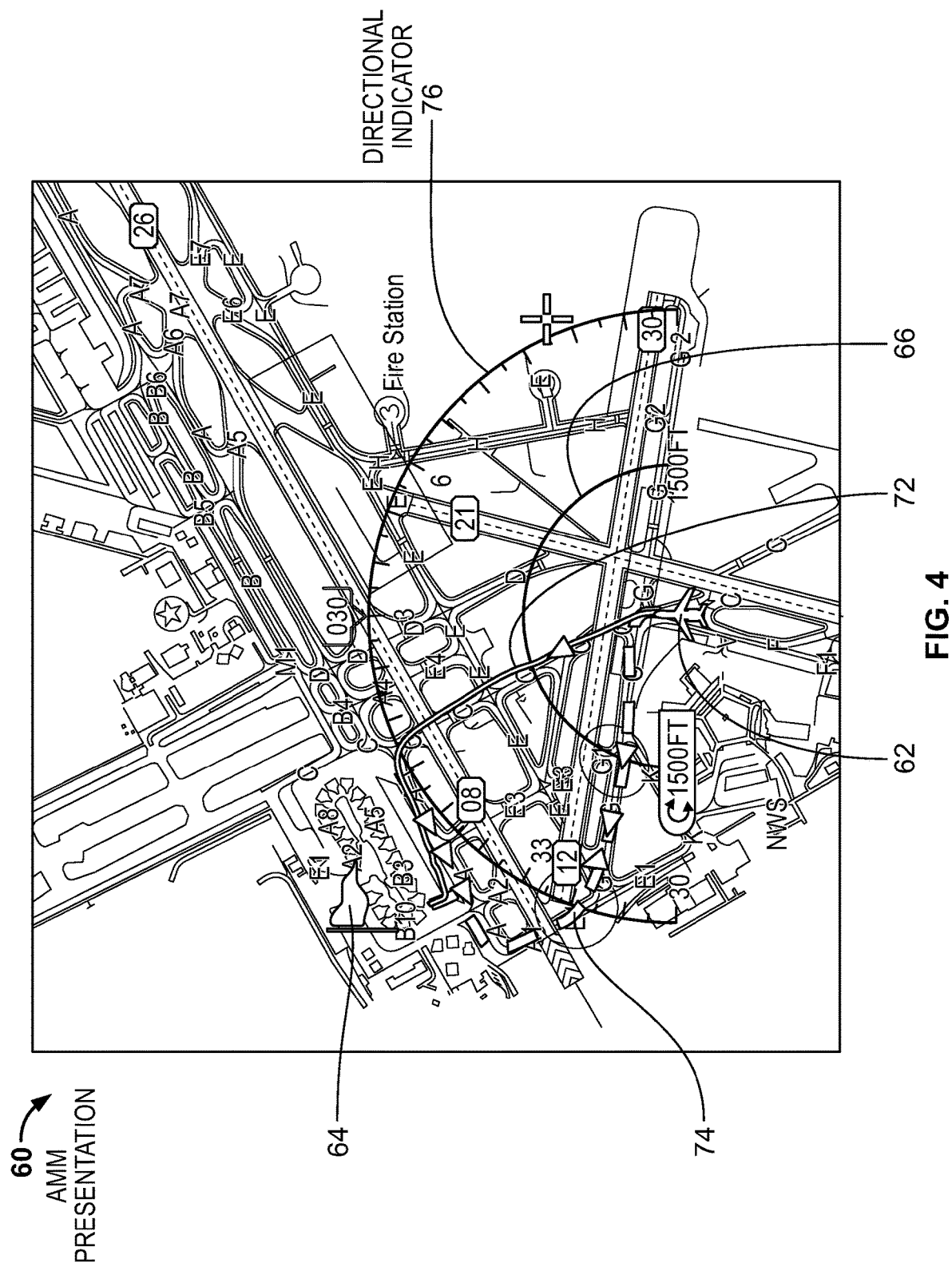
FIG. 4 is an airport moving map presentation generated by the cockpit display system, in accordance with an exemplary embodiment.

In embodiments, the display device 34 (or plural display devices 34) includes a head down display (HDD), a head up display (HUD), a wearable HUD, a portable display or any combination thereof. In embodiments, the display device 34 is controlled by the processing system 20 to output an AMM presentation 60 as shown in FIGS. 2 to 4. In the exemplary embodiments, the AMM presentation 60 includes a destination indicator 64 corresponding to the taxi destination on the AMM based on the destination data 44, an ownship indicator 62 corresponding to a position of the ownship on the AMM based on the ownship location data 46 and a route indicator 72 graphically depicting the route, determined by the processing system 20, between the ownship position and the destination.

In the exemplary embodiment of FIG. 1, the cockpit display system 12 includes the NOTAM receiver 50 for receiving NOTAM communications from ground stations and any other sources. A NOTAM is a notice filed with an aviation authority to alert aircraft pilots of potential hazards along a flight route or at a location that could affect the safety of the flight. NOTAMs are distributed by means of telecommunication that contain information concerning the establishment, conditions or change in any aeronautical facility, service, procedure or hazard, the timely knowledge of which is essential to personnel and systems concerned with flight operations. Of particular relevance to the present disclosure are NOTAMs that are relevant to taxiways and runways. NOTAMs can include information on closed taxiways or runways, obstacles on taxiways or runways and notifications of runway/taxiway/apron status with respect to snow, ice, and standing water. The processing system 20 uses such information in route planning so as to avoid closed runways or taxiways or runways or taxiways that should be avoided to ensure that available dynamic information is included when determining the route to the taxi destination.

In embodiments, the cockpit display system includes the aircraft database 18, which includes three-dimensional (3D) aircraft models for each of many known aircraft types. The aircraft database 48 includes information on aircraft dimensions such as wingspan and aircraft weight related to aircraft type (e.g. an aircraft model identifier such as A380). The relevant aircraft information is included in aircraft data 48. The processing system 20 may interrogate the aircraft database 18 using a flight identifier or aircraft model identifier, which has been obtained from the traffic data 42. Aircraft profile information for that aircraft including weight, wingspan and possibly other size dimensions can be returned to the processing system as part of the aircraft data 48. The processing system 20 can determine other aircraft that have a similar (e.g. within predetermined ranges) profile to the profile of the ownship aircraft 10, which can be used in determining preferential routes by the route planning algorithm and also in determining probable runway exits after landing. That is, the length of runway required by the ownship aircraft 10 can dynamically change depending on environmental factors (such as wind), which can be predicted by monitoring landing requirements for similar aircraft. Further, ATC may already have cleared a taxiing route for a leading aircraft having a similar profile. By preferentially following that aircraft, the route planning algorithm is more likely to determine upon a taxiing route that is consistent with one approved by ATC. In some embodiments, the aircraft database 18 and the AMDB 16 are integrated into one database.

Figure 5:
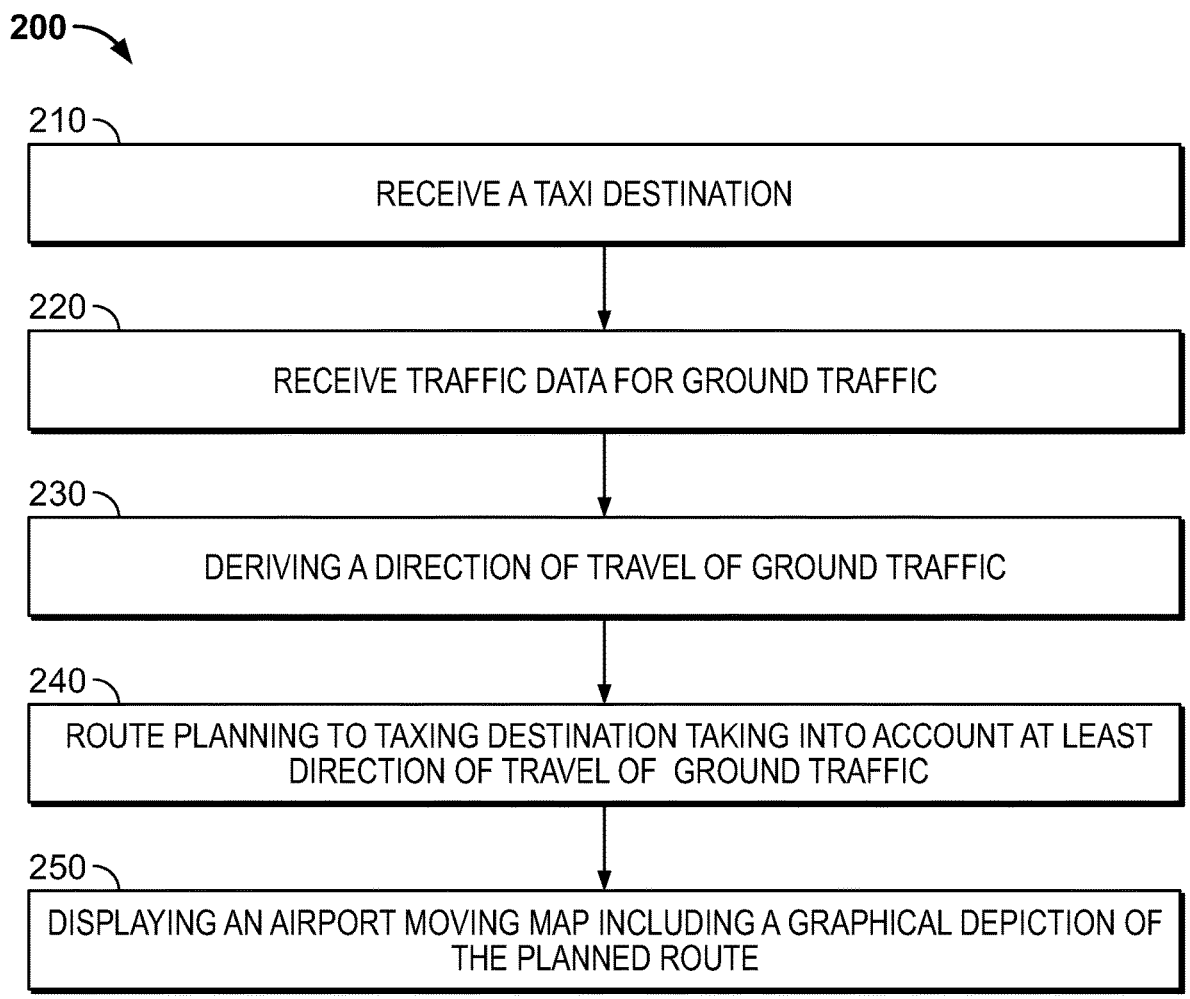
FIG. 5 is a flow chart of a method of displaying a taxiing route on an airport moving map, in accordance with an exemplary embodiment.

In embodiments, the processing system 20 implements functions of the cockpit display system 12 of FIG. 1 and steps of the method 200 of FIG. 5 according to example embodiments of the present disclosure. The processing system 20 includes one or more processor(s) 28 and one or more memory device(s) 30. The one or more processor(s) 28 can include any suitable processing device, such as a microprocessor, microcontroller, integrated circuit, logic device, or other suitable processing device. The one or more memory device(s) 30 can include one or more computer-readable media, including, but not limited to, non-transitory computer-readable media, RAM, ROM, hard drives, flash drives, or other memory devices. It should be appreciated that the functions of the traffic processor 82 described above could be included in the processing system 20.

The one or more memory device(s) 30 can store information accessible by the one or more processor(s) 28, including one or more computer program(s) 31, which include computer-readable instructions that can be executed by the one or more processor(s) 28. The instructions can be any set of instructions that, when executed by the one or more processor(s) 28, cause the one or more processor(s) 28 to perform operations. The instructions can be software written in any suitable programming language or can be implemented in hardware. In some embodiments, the instructions can be executed by the one or more processor(s) 28 to cause the one or more processor(s) 28 to perform operations, such as the operations for determining the taxiing route and generating the AMM presentations 60 of FIGS. 2 to 4, otherwise implementing the cockpit display system 12 and performing the computer implemented steps of method 200 of FIG. 5. Although the various modules 22, 24, 26, 32 and 35 are shown separately from the computer program 31, it is envisaged that the processor 28 implements these modules 22, 24, 26, 32 and 35 by executing the computer program 31 (or computer programs).

The processing system 20 includes a direction of traffic module 22, a route planning module 24, a similar traffic module 35, a cross-check module 26 and a display generation module 32. The direction of travel module 22 receives the traffic data 42 including traffic identifiers for ground vehicles at the airport and location information for each traffic identifier. The direction of traffic module 22 can monitor the location for each ground traffic item over more than one traffic data reporting cycle to determine a direction of travel parameter. In some embodiments, two, three, four, etc. successive location coordinates for each ground traffic item (e.g. aircraft or other ground vehicle) can be used to plot a progression of the vehicle, which can be incorporated into a direction of travel vector. A simpler direction of travel parameter could also be constructed, which merely indicates a direction of travel (rather than including a collection of location data points) such as a direction of travel in compass coordinates. The direction of travel parameter is included in the direction of travel data 52 for use by the route planning module 24. The time window over which the location data of each ground vehicle is monitored to determine the direction of travel vector is a configurable parameter of the processing system 20. For example, the time window can be 10 seconds or more, 1 minute or more, 10 minutes or more, etc. This parameter can be decided based on ensuring relevancy of traffic data 42 and processing efficiency. In some embodiments, the direction of travel data 52 is determined by the traffic computer 14, which can thus be considered part of the processing system 20.

The processing system 20 includes the route planning module 24, which receives, as inputs, at least the traffic data 42, the direction of travel data 52, the airport data 4040, the ownship location data 46 and the destination data 44. The route planning module 24 embodies a route planning algorithm that calculates a route from a start point to a destination location. The destination is set based on the destination data 44, which may be pilot entered through the user interface 44 or obtained from an avionics system of the aircraft 10. The start point is often the ownship location based on ownship location data 46 but projected or planned starting points may be obtained from other avionics systems. The route planning algorithm accesses the airport data 4040, which includes a map of taxiways, runways, aprons, etc. at the airport. In various embodiments, the airport data 4040 defines the map to include a network or graph of segments or edges that connect nodes or junctions. The route planning module 24 is able to place or mark each segment with any traffic items determined to be located on the segment and to also include the direction of travel of each traffic item based on the traffic data 42 and the direction of traffic data 52. In embodiments, the route planning algorithm assigns a cost or weight to each segment, which is generally based on the distance or average traversal time of the segment. The route planning algorithm calculates the route based on a target of minimizing the overall cost or weight of the route. The route planning module 24 determines the flight plan so as to biased against determining a route that includes one or more segments with traffic flowing against the direction of travel of the determined route. The bias can be implemented in many ways including excluding such segments as options in the routing process or adding weight or cost to the associated segment or segments. The route planning module 24 outputs route planning data 54 describing the determined route, e.g. in terms of taxiway, runway, apron, etc. identifiers.

In one embodiment, the route planning algorithm works on the principals of finding a route through a network of interconnected grid points (or nodes), with edges between these connected grid points given certain costs or distances associated therewith. The grid nodes, edges and costs are retrieved from, or derived from, the airport data 40. One exemplary route planning algorithm is known as A* (A-Star). When implemented in the route planning module 24, the A* algorithm attempts to find a shortest path through the grid points from the starting location to the destination location, connecting the segments into a whole path. For traffic conditions, the edge availability is evaluated in real time when the route computation is conducted based on the traffic data 42 and the direction of travel data 52. When the route is passing a segment or edge with a traffic target moving along the direction of the route, the edge is available. If the traffic is moving against the route direction, the segment or edge is not available and is excluded from the route computation. In other embodiments, a biasing can be added to the cost or distance when there is contraflow traffic.

In further embodiments, the route planning algorithm of the route planning module 24 takes into account the traffic data 54 in further ways. In addition to favoring routes where any traffic is moving in a direction of travel that is aligned with the direction of travel of the route, further traffic parameters may be derived and factored into the route planning algorithm. One exemplary further traffic parameter is traffic density. A number of traffic items on each segment can be divided by a distance of each segment to provide a metric of traffic per unit distance or traffic density. Other metrics of traffic density could be derived from the traffic data 42. In this way, when the traffic flow is in the same direction on more than one traffic segment, traffic segments having a lower traffic density are preferred by the route planning algorithm. Another exemplary further traffic parameter is recency of traffic data 42. Where one or more traffic items has traversed one segment more recently than another segment (which is known from the timestamp of the traffic data 42), the segment that has more recently been traversed is preferred by the route planning module 24. Another further traffic parameter that could be taken into account by the route planning module 24 is time for traffic to traverse a segment. The traffic data 42 could be monitored over a time window sufficiently long to obtain recent travel time for various segments. The route planning algorithm will prefer routes that use lower time segments. The costs for each segment or edge may be adjusted based on one or more of these further traffic parameters in order for the route planning algorithm to factor them into the route calculation.

In some embodiments, the route planning module 24 utilizes, as a further input, the NOTAM data 50, which provides information on runways and taxiways that are closed or taxiways or runways having obstacles or weather conditions that are causing disruption. The NOTAM data 50 is dynamic and will provide information on changing availability of runways or taxiways. The route planning algorithm can exclude segments identified in the NOTAM data 50 when those segments are not available or should preferably be avoided. In one example, where the route planning algorithm uses a map of edges and nodes to represent the airport for route planning, if a NOTAM closes a taxiway (for example), the edge or the connection between the grid points or nodes is removed from the network. The route planning algorithm must find adjacent grid points or nodes having edges to go further toward the destination, thereby avoiding the runway or taxiway subject to the NOTAM issue.

In some embodiments, the NOTAM data 50 is cross-checked by the cross-check module 26. The cross-check module 26 receives the traffic data 42 and the NOTAM data 50. When the NOTAM data 50 describes a runway or taxiway as not being available, the traffic data 42 can be used to check whether such information is up to date. That is, if the traffic data 42 shows traffic currently on the runway or taxiway or shows that traffic has been on the runway or taxiway within a recent time window that is after a timestamp of the NOTAM, then the cross-check module 26 can conclude that the NOTAM data 50 is at least partly out of date. The cross-check module 26 can output one or more segments (or runways or taxiways) of the airport map in the form of cross-check data 60 that have been determined to be available in contradiction to the information contained in the NOTAM data 50. The route planning module 24 is responsive to the cross-check data 60 to ignore the identified parts of the NOTAM data 50 by including those segments as available in the route planning algorithm.

In embodiments, the route planning module 24 utilizes, as an input, weight restriction data for the airport, which can be obtained from airport data 40 or from dynamic sources. The route planning module 24 can compare a current weight of the aircraft 10 (which is determinable based on remaining fuel and initial aircraft weight) to weight restrictions for runways and taxiways. When weight limits are not met, these runways or taxiways are removed from being available when planning the route. For example, edges and nodes in a graph type map forming the basis for route planning can be removed when the ownship aircraft 10 has a greater weight than the set weight limits.

In some embodiments, the cockpit display system 12 includes the similar traffic module 35, which receives the traffic data 42 and the aircraft data 48 and identifies traffic having a similar profile to the ownship aircraft 10. The traffic data 42 includes an identifier for each traffic item. The identifier can be used to determine an aircraft type using a look up table, for example. The similar traffic module 35 receives aircraft profile information for a given aircraft type based on the aircraft data 48. The aircraft profile information is included in the aircraft data 48 received by the similar traffic module 35. The similar traffic module 35 compares the ownship profile, which may be stored on memory 30, with the profile of other traffic items. When a determination is made of sufficient similarity (e.g. when predetermined criteria are met), the traffic item is identified as being a similar aircraft. The identified similar aircraft is/are output as part of similar aircraft data 62. In embodiments, the comparison of aircraft profiles includes comparing one or more of wingspan, weight, height and engine and braking characteristics to determine whether sufficient similarity criterion has been met.

In accordance with various embodiments, the route planning module 24 preferentially utilizes routes that have recently (within a certain time window from the present) been traversed by traffic identified as having a similar profile. In such an exemplary embodiment, the route planning module 24 has the similar aircraft data 62 as a further input. The certain time window is a configurable parameter and may be the same as the window over which the traffic data 42 is monitored (as described hereinbelow). The route planning module 24 can adjust down the cost/distance/weight associated with segments or edges of the airport map forming the basis for the route planning algorithm. This down adjustment for any given segment of taxiway or runway can be performed when the similar aircraft data 62 identifies other traffic having a similar profile that has recently been positioned on that segment (and moving in the same direction of travel as the route being planned).

In embodiments, the similar traffic module 35 predicts an exit taxiway from a runway on which the ownship aircraft 10 is to land. That is, the similar traffic module 35 identifies traffic having similar profiles that have recently (within a certain time window from the present) landed on the same runway as the planned or current runway for the ownship aircraft 10. The runway for the ownship aircraft 10 can be obtained by the similar traffic module 35 from the flight plan or from the ownship location data 46 in combination with the airport map included in the airport data 40. Similar traffic can be identified as described above and whether such similar traffic have recently landed is determinable based on the traffic data 42 showing that a traffic item has recently been located on the runway and has a trajectory extending along the runway. Since the weight, and optionally wingspan and possibly other characteristics of the other aircraft, has been determined to be similar by the similar traffic module 35, a predication can be made that the exit taxiway for the ownship aircraft 10 will likely match that of the similar traffic. The similar traffic module 35 can thus output, as part of similar aircraft data 62, the exit taxiway for similar aircraft sharing the same landing runway. The route planning module 24 can include the exit taxiway as the start point or a via point for route planning. Further, and as one example, the display generation module 32 can initiate display of the route on the AMM presentation 60 when the exit taxiway is reached by the ownship aircraft 10.

In embodiments, the display generation module 32 generates the AMM presentations 60 described herein with respect to FIGS. 2 to 4 based on the airport data 40 and the route data 54. The display generation module 32 generates AMM display data 56, which describes the AMM for display by the display deice 34. Further, the display generation module 32 outputs route display data 58, which describes, optionally as a graphical overlay, the taxiing route determined by the route planning module 24 for display by the display device 34. The display generation module 32 can display further features, such as a range ring, speed measurements, traffic indicators, an ownship indicator, etc.

FIG. 2 shows an exemplary AMM presentation 60. The AMM presentation 60 is shown without an overlaid graphical route indicator for purposes of comparison with the AMM presentation 60 of FIG. 3. The AMM presentation 60 includes an ownship indicator 62, which is positioned based on the ownship location data 46. The AMM presentation 60 includes a range indicator 66 to illustrate a scale of the AMM presentation 60. The AMM presentation 60 includes traffic indicators 68a-68f in the form of symbology representing ground traffic at the airport, which is based on the traffic data 42. The traffic indicators 68a-68f are positioned in image space corresponding to the location of each traffic item and include an indication of direction of travel, which can be based on the DOT data 52. The exemplary traffic indicators 68a-68f are in the form of a triangle shaped symbol with a direction of pointing of the triangle shape determined by the direction of travel of the corresponding traffic item. The AMM presentation 60 includes a graphical destination indicator 64, which is based on the destination data 44 and is in the form of a flag in the present example. The AMM presentation 60 graphically depicts various airport features including runways, taxiways, aprons and buildings, which are based on corresponding information in the airport data 40. At least the runways and taxiways are depicted with alphanumeric identifiers such as runway 16L and taxiway A in the AMM presentation 60.

FIG. 3 shows an exemplary AMM presentation 60 that is similar to that of FIG. 2 and includes a route indicator 72 and a route indicator comparison 74. The route indicator comparison 74 would not be included in the AMM presentation 60 according to the present disclosure, but is shown for the purposes of explanation.

In the example of FIGS. 2 and 3, traffic items 68c, 68d are travelling from north to south via taxiway P, while traffic items 68a, 68b are travelling from north to south via taxiway K. The traffic data 42 and the airport data 40 allows the route planning module 24 to know that taxiway P and K will most likely not allow travel from south to north, at least at that moment. Assuming the ownship aircraft 10 is at the position of the ownship indicator 62 in the AMM presentation 60 and the pilot enters, via user interface 38, destination 16L, a route planning algorithm using a shortest route algorithm might generate a route that takes P or K to get to 16L without the understanding of direction of travel of each taxiway. FIG. 3 shows such a route extending along taxiway P in the form of route indicator comparison 74. The resulting route of route indicator comparison 74 would be incorrect and would not coincide with the information subsequently provided by ATC. This sub-optimal result would force the pilot to enter more control point information to rectify the result and to bring the route into consistency with the ATC cleared route, therefore increasing the workload. However, with the understanding of direction of each taxiway, the route planning module 24 will determine the route shown by route indicator 72. In this way, the correct path has been determined and displayed in consistency with clearance provided by ATC. The route of route indicator 72 has been determined with only the destination input through the user interface 38, thereby significantly decreasing pilot workload. Yet further, ATC clearance can be easily submitted by merely reading back the route shown on the AMM presentation 60 or by selecting a button to send the route to ATC which can proceed automatically via an ATC datalink. When the button is selected, the route shown by route indicator 72 is coded according to ATC standard communications and transmitted over the ATC datalink (not shown).

FIG. 4 provides another exemplary AMM presentation 60 according to the present disclosure. AMM presentation 60 includes many of the same features as that of FIGS. 2 and 3 including the destination indicator 64, the ownship indicator 62, the range indicator 66, traffic indicators (not labelled but shown as directional triangles) and taxiway, runway and other airport feature labels/identifiers. The AMM presentation 60 additionally includes a directional indicator 76, which may be defined in compass coordinates. As shown, runways 08 and 12 are crowded in that there are traffic items waiting for taking off from these two runways. The ownship aircraft 10 is at the position of the ownship indicator 62 and the destination, which has been entered by the pilot through the user interface 38, is at the B11 parking stand. Without traffic data 42 identifying the congestion at the end of both runways 08 and 12, another route planning algorithm would most likely find the route shown by the route indicator comparison 74. However, the route planning module 24 uses the traffic data 42 to determine a traffic density parameter and a traffic recency parameter for each segment, which leads the route planning algorithm to determine the route represented by the route indicator 72 rather than the route indicated by route indicator comparison 74.

FIG. 5 is a process flow chart detailing a method 200 for determining and displaying a taxiing route for leading an aircraft to an input destination. Method 200 is executed by the cockpit display system 12 of FIG. 1. The order of operation within the method 200 is not limited to the sequential execution as illustrated in the figure, but may be performed in one or more varying orders as applicable and in accordance with the present disclosure. Steps of the of method 200 are performed by the one or more processors 34, 82 of the processing system 20 and the traffic computer 74 executing computer programming instructions included in at least the computer program 31. Method 200 may be instigated when the user inputs the destination or, if the destination is automatically input, when the ownship aircraft 10 is determined to have landed based on system sensors (e.g. wheel weight sensors) and when the ownship aircraft 10 is determined to have reached a speed below a set threshold. Method 200 can be implemented in preparation for take-off or during/after the landing phase of the flight.

The method 200 includes step 210 of receiving a taxi destination as a target for the route planning module 24. The taxi destination may include global coordinates, coordinates local to the destination airport or identifiers of airport features such as runways, gates, parking stands, etc. The taxi destination may be input by the crew through the user interface 38, which may be performed by selecting the destination on a touchscreen AMM presentation 60 or through a keyboard (virtual or physical), for example. The taxi destination may also be input automatically from an aircraft system such as the FMS.

The method 200 includes step 220 of receiving the ground traffic data 42 about ground traffic at the airport. The ground traffic data 42 may be received from ground traffic via ADS-B and/or from other traffic information sources. The traffic computer 14 or the direction of travel module 22 monitors each ground traffic item to determine the direction of travel data 52, thereby deriving a direction of travel of ground traffic in step 230.

The method 200 includes step 240 of calculating a route, via the route planning module 24, from a starting location to the taxi destination taking into account at least the direction of travel data 52 and the traffic data 42. The route is calculated by evaluating many combinations of runways and taxiways (which may themselves be segments or be broken into plural further segments) described in the airport data 40. Generally, the starting location is the current position of the ownship aircraft 10 as known from the ownship location data 46. The route planning module 24 implements a route planning algorithm that prefers routes that run in the same direction as the direction of travel of any traffic over routes that run counter to the direction of travel of any traffic. The route planning algorithm may also derive a traffic density parameter and prefer routes that have lower traffic density. The route planning algorithm may further derive one or more traffic recency parameters representing how recently traffic followed at least part of a route and may prefer routes that have more recently been traversed by other aircraft than routes following traffic that traversed at least part of the route a longer while ago. The route planning algorithm may prefer routes recently followed by aircraft identified to have a similar profile according to the similar aircraft data 62. The route planning algorithm may include a runway exit into the route planning process as a via point or a start point. The runway exit can be determined based on another aircraft that has been identified as having landed on the same runway and which has a similar profile. Similar aircraft that have landed on the same runway can be included in the similar aircraft data 62 determined by the similar traffic module 35. Further, the route planning algorithm may factor in any closures of runways or taxiways according to the NOTAM data 50 and may only factor in such closures when the cross-check data 60 confirms the closure. The route planning algorithm will also aim to minimize the distance or time required for the route whilst taking into account any one or more of the aforementioned parameters and traffic information. Various methods for incorporating the different input data in determining the route can be used by the route planning algorithm including excluding segments and adjusting costs associated with each segment.

The method includes step 250 of displaying an AMM presentation 60 including synthetically depicted taxiways, runways and other airport features based on information obtained from the airport data 40. The route determined by the route planning module 24 is overlaid on the AMM presentation 60 in the form of the route indicator 72. The pilot is able to follow this route even before complete taxi route clearance has been obtained from ATC. Further, the route has a higher probability of being in alignment with the cleared taxi route received from ATC because of the sophisticated manner by which traffic data and other dynamic airport parameters are factored into the route planning algorithm. The pilot can thus easily confirm or validate the ATC cleared route by reading off the AMM presentation 60 or by selecting a button (virtual or physical) through the user interface 38. Selecting the button transmits the shown route by way of a datalink and an automated process of converting the route data 54 determined by the route planning module 24 into a data format required for ATC communications.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. For example, the solution can be further broadened to non-weather information (e.g. airspaces). It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cockpit display system onboard an aircraft, the cockpit display system comprising:
    a display device;
    an airport mapping database describing at least taxiways and runways at an airport;
    an aircraft database;
    a traffic receiver configured to receive traffic data concerning ground traffic on taxiways and/or runways at an airport, wherein the traffic receiver includes an Automatic Dependent Surveillance-Broadcast (ADS-B) receiver; and
    at least one processor in operable communication with the display device, the at least one processor configured to execute program instructions, wherein the program instructions are configured to cause the at least one processor to:
        receive a taxi destination and the traffic data, wherein the traffic data includes an aircraft identifier;
        derive, based on the traffic data received by the ADS-B receiver, a location of the ground traffic with respect to taxiways or runways and a direction of travel of the ground traffic;
        derive aircraft model information including wingspan and weight by retrieving the aircraft model information from the aircraft database using the aircraft identifier;
        determine at least one aircraft having a similar landing profile to the ownship aircraft based on the aircraft model information by determining whether the wingspan and weight of the ownship aircraft is similar to that of the at least one aircraft within predetermined ranges;
        execute a route planning algorithm for determining a route including one or more taxiways and runways from an aircraft location to the taxi destination using, as inputs, airport data from the airport mapping database, the location of the ground traffic derived based on the traffic data received by the ADS-B receiver, the direction of travel of the ground traffic, and the taxi destination, wherein the route planning algorithm prefers routes traversed, within a recent time window, by the at least one aircraft having the similar landing profile;
        generate a display for the display device including an airport moving map based on airport data from the airport mapping database and including a graphical depiction of the route on the airport moving map; and
        receive selection of a button to cause transmission of the route to Air Traffic Control (ATC) by way of a datalink and an automated process of converting route data representing the route into a data format for ATC communications.

2. The cockpit display system of claim 1, wherein the program instructions are configured to cause the at least one processor to determine whether a taxiway is one-way or bidirectional based on the location of the ground traffic and the direction of travel and to execute the route planning algorithm for determining the route additionally using the determination as to whether the taxiway is one-way or bidirectional.

3. The cockpit display system of claim 1, wherein the program instructions are configured to cause the at least one processor to estimate an exit taxiway for the ownship aircraft based on the at least one aircraft having a similar landing profile and to execute the route planning algorithm for determining the route additionally using the exit taxiway.

4. The cockpit display system of claim 1, comprising a NOtice To Airmen (NOTAM) receiver configured to receive NOTAM data, wherein the program instructions are configured to cause the at least one processor to execute the route planning algorithm for determining the route using the airport data, the NOTAM data and the taxi destination as inputs.

5. The cockpit display system of claim 4, wherein the NOTAM data includes at least one of closed runway or taxiway data, wingspan limitation data and obstacle data.

6. The cockpit display system of claim 4, wherein the program instructions are configured to cause the at least one processor to cross-check the closed runway or taxiway data based on the traffic data.

7. The cockpit display system of claim 1, wherein the program instructions are configured to cause the at least one processor to execute a route planning algorithm for determining the route additionally using historic or preferred taxiway data and/or weight restriction data.

8. The cockpit display system of claim 1, wherein the route planning algorithm uses a graph of nodes connected by edges corresponding to available taxiways and runways at the airport, wherein each edge has a cost associated therewith and the route planning algorithm is configured to minimize the cost when determining the route.

9. The cockpit display system of claim 8, wherein the route planning algorithm excludes one or more edges corresponding to one or more taxiways at the airport when the direction of travel of the ground traffic is opposite to a direction of travel of the route.

10. A method of displaying a taxiing route on an airport moving map, the method performed on a cockpit display system onboard an aircraft, the method comprising:
    receiving, via at least one processor, a taxi destination and traffic data for ground traffic, wherein the traffic data is received from a traffic receiver, wherein the traffic receiver includes an Automatic Dependent Surveillance-Broadcast (ADS-B) receiver, wherein the traffic data includes an aircraft identifier;
    deriving, via the at least one processor, a location of the ground traffic with respect to taxiways or runways at an airport and a direction of travel of the ground traffic using the traffic data received by the ADS-B receiver;
    deriving, via the at least one processor, aircraft model information including wingspan and weight by retrieving the aircraft model information from an aircraft database using the aircraft identifier;
    determining, via the at least one processor, at least one aircraft having a similar landing profile to the ownship aircraft based on the aircraft model information by determining whether the wingspan and weight of the ownship aircraft is similar to that of the at least one aircraft within predetermined ranges;

executing, via the at least one processor, a route planning algorithm to determine a route including one or more taxiways and runways from an aircraft location to the taxi destination using, as inputs, airport data from an airport mapping database, the location of the ground traffic derived based on the traffic data received by the ADS-B receiver, the direction of travel of the ground traffic, and the taxi destination, wherein the route planning algorithm prefers routes that include taxiways in which a direction of travel of the route follows the direction of travel of the ground traffic to routes that include taxiways in which the direction of travel of the route is counter to the direction of travel of the ground traffic, wherein the route planning algorithm prefers routes traversed, within a recent time window, by the at least one aircraft having the similar landing profile;

generating, via the at least one processor, a display for the display device including an airport moving map based on airport data from the airport mapping database and including a graphical depiction of the route on the airport moving map; and receiving selection of a button to cause transmission of the route to Air Traffic Control (ATC) by way of a datalink and an automated process of converting route data representing the route into a data format for ATC communications.

11. The method of claim 10, comprising determining, via the at least one processor, whether a taxiway is one-way or bidirectional based on the location of the ground traffic and the direction of travel and executing the route planning algorithm for determining the route additionally using the determination as to whether the taxiway is one-way or bidirectional.

12. The method of claim 10, comprising identifying taxiing information for the at least one aircraft having the similar profile and executing, via the at least one processor, the route planning algorithm for determining the route additionally based on the taxiing information.

13. The method of claim 10, comprising a NOtice To Airmen (NOTAM) receiver configured to receive NOTAM data, wherein the program instructions are configured to cause the at least one processor to execute the route planning algorithm for determining the route additionally using the NOTAM data as one of the inputs.

14. The method of claim 13 wherein the NOTAM data includes at least one of closed runway or taxiway data, wingspan limitation data and obstacle data.

15. The method of claim 13, comprising cross-checking, via the at least one processor, the closed runway or taxiway data based on the traffic data.

16. The method of claim 10, comprising determining the route additionally using historic or preferred taxiway data and/or weight restriction data.

17. The method of claim 10, wherein the route planning algorithm uses a graph of nodes connected by edges corresponding to available taxiways and runways at the airport, wherein each edge has a cost associated therewith and the route planning algorithm minimizes the cost when determining the route.

18. The method of claim 17, wherein the route planning algorithm excludes one or more edges corresponding to one or more taxiways at the airport when the direction of travel of the ground traffic is opposite to a direction of travel of the route.

\* \* \* \* \*